United States Patent
Novoselov (10) Patent No.: US 10,676,679 B2
(45) Date of Patent: Jun. 9, 2020

(54) MULTISPARK REACTOR

(71) Applicant: LTEOIL LLC, Houston, TX (US)

(72) Inventor: Yury Novoselov, Houston, TX (US)

(73) Assignee: LTEOIL LLC, Houston, TX (US)

( * ) Notice: Subject to any disclaimer, the term of this patent is extended or adjusted under 35 U.S.C. 154(b) by 0 days.

(21) Appl. No.: 16/090,110

(22) PCT Filed: Mar. 30, 2017

(86) PCT No.: PCT/US2017/024920
§ 371 (c)(1),
(2) Date: Sep. 28, 2018

(87) PCT Pub. No.: WO2017/173028
PCT Pub. Date: Oct. 5, 2017

(65) Prior Publication Data
US 2019/0112533 A1    Apr. 18, 2019

Related U.S. Application Data

(60) Provisional application No. 62/315,818, filed on Mar. 31, 2016.

(51) Int. Cl.
| | |
|---|---|
| *C10G 15/08* | (2006.01) |
| *F23Q 13/00* | (2006.01) |
| *F02C 7/266* | (2006.01) |
| *H05H 1/52* | (2006.01) |
| *F02P 23/04* | (2006.01) |

(52) U.S. Cl.
CPC .............. *C10G 15/08* (2013.01); *F02C 7/266* (2013.01); *F02P 23/04* (2013.01); *F23Q 13/00* (2013.01); *H05H 1/52* (2013.01); *C10G 2300/302* (2013.01)

(58) Field of Classification Search
None
See application file for complete search history.

(56) References Cited

U.S. PATENT DOCUMENTS

| | | |
|---|---|---|
| 4,077,870 A | 3/1978 | Horowitz |
| 5,141,715 A | 8/1992 | Sackinger et al. |
| 5,626,726 A | 5/1997 | Kong |
| 2004/0182707 A1* | 9/2004 | Jardemark ............. B82Y 15/00 204/451 |
| 2019/0030509 A1* | 1/2019 | Wu .......................... C10L 1/026 |

FOREIGN PATENT DOCUMENTS

WO    WO-2014/209803 A1    12/2014

OTHER PUBLICATIONS

International Search Report and Written Opinion in International Application No. PCT/US2017/024920 dated Jun. 27, 2017 (8 pages).

* cited by examiner

*Primary Examiner* — Tam M Nguyen
(74) *Attorney, Agent, or Firm* — Foley & Lardner LLP

(57) ABSTRACT

A device includes a channel having an inlet and an outlet, a first electrode disposed within the channel, and a second electrode disposed within the channel so as to define a gap between the second electrode and the first electrode. The device further includes a power source connected to at least one of the electrodes. The second electrode includes a lumen from a first end of the second electrode to a second end of the second electrode. The lumen is configured to introduce a carrier gas to the gap. The inlet is configured to introduce a process stream to the channel. The process stream comprises a viscous petroleum feed material. The power source is configured to produce a spark within the gap, thereby generating a plasma configured to reduce a viscosity of the viscous petroleum feed material and to form a processed petroleum material.

17 Claims, 7 Drawing Sheets

MULTISPARK REACTOR

CROSS-REFERENCE TO RELATED APPLICATIONS

This application is a U.S. national stage application under 35 U.S.C. § 371 of International Application No. PCT/US2017/024920, filed on Mar. 30, 2017, which claims the benefit of priority to U.S. Provisional Patent Application No. 62/315,818, filed on Mar. 31, 2016, the contents of each of which are incorporated herein by reference in their entirety for any and all purposes.

TECHNICAL FIELD

The present disclosure relates, in general, to a multispark reactor. More particularly, the present disclosure relates to processing oil products using electrical discharges from a multispark reactor.

BACKGROUND

The following description is provided to assist the understanding of the reader. None of the information provided or references cited is admitted to be prior art.

Oil and oil products are used globally in many different forms, such as fuel, lubricants, building materials, etcetera. Crude oil (e.g., raw oil) is typically pumped from the ground, such as at an oil well site on land or using platforms on the water. The crude oil is then transported to a production facility for processing. The crude oil may be transported via pipes, valves, ports, hoses, tankers, and the like. However, oftentimes the crude oil is more viscous than desired for transport, and in many instances, the viscosity of the crude oil must be reduced prior to transport, to facilitate better flow and movement of the crude oil.

Various methods are used to decrease the viscosity of crude oil. For example, oil diluents can be used to facilitate flow of the crude oil. One example oil diluent is fresh water. The crude oil is mixed with the diluent at the source of the oil, and then after the crude oil arrives at its destination (e.g., a processing plant, production plant, refinery, etc.), the crude oil and diluents are separated. The initial separation of the oil diluents from the crude oil typically results in contaminated oil diluents. Thus, where the diluent is water, separation of the water from the oil post-transport, results in contaminated water this is difficult to dispose. Demulsifiers may be used to aid in the separation of the oil from the water, however separation from the oil, the water then may contain the demulsifers, residual crude oil, and impurities from the crude oil, making the water unsuitable for return to the environment without substantial treatment.

Non-water diluents can also be used to reduce the viscosity of crude oil. For example, mixtures of light fractions of oil may be obtained via thermal cracking, catalytic cracking, catalytic reforming, or via other methods known in the art, with such light fractions of oil being mixed with the heavy oil and/or bitumen, in order to decrease the viscosity thereof. Using the light oil fractions usually includes special mixing stations before the crude oil is transported, and separation stations at the destination. Oftentimes, material is transported in both directions. For example, one pipeline is used to transport the diluted crude oil to a production facility from a well site, and another pipeline is used to transport the diluents from the production facility to the well site for reuse. Thus, in such examples, significant cost is incurred for the additional transportation, such as by truck or additional pipelining; processing equipment, such as mixing stations, separation stations; energy; and the like. The present application seeks to reduce the costs associated with viscosity reduction in crude oil and bitumen.

SUMMARY

In one aspect, a multispark reactor device includes a channel having an inlet and an outlet, a first electrode disposed within the channel, and a second electrode disposed within the channel so as to define a gap between the second electrode and the first electrode. The device includes a power source connected to at least one of the electrodes. The second electrode includes a lumen from a first end of the second electrode to a second end of the second electrode. The lumen is configured to introduce a carrier gas to the gap. The inlet is configured to introduce a process stream to the channel. The process stream includes a viscous petroleum feed material. The power source is configured to produce a spark within the gap, thereby generating a plasma configured to reduce a viscosity of the viscous petroleum feed material and to form a processed petroleum material. The outlet is configured to convey the processed petroleum material from the channel to a collection point.

In another aspect, a method of using the above device includes introducing a process stream through a channel that comprises a gap defined by a first electrode and a second electrode. The process stream includes a viscous petroleum feed material. The second electrode includes a lumen from a first end of the second electrode to a second end of the second electrode. The method also includes introducing a carrier gas to the gap via the lumen and generating a plasma by producing a spark within the gap. The plasma is configured to reduce a viscosity of the viscous petroleum feed material and to form a processed petroleum material. The method further includes conveying the processed petroleum material from the channel to a collection point.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure, and, therefore, are not to be considered limiting of its scope; the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present application is directed to devices and processes for reducing the viscosity of a viscous petroleum feedstock, such as, but not limited to, crude oil and bitumen, by producing light oil fractions directly from the viscous petroleum feedstock that may then act as a diluent for transport. Because the systems are used directed on the feedstock, the use of diluents and the energy and waste associated therewith can be reduced or eliminated. In some embodiments, diluents are not added to the crude oil to decrease the viscosity of the crude oil, but rather the light oil fraction produced is the diluent. In some embodiments, light oil fractions are formed in the crude oil directly. The systems and methods provide for the use of an electrical discharge through a gas stream in crude oil. The discharge heats and breaks down heavy hydrocarbon molecules, thereby facilitating synthesis of lighter molecules. A plurality of electrical discharges can be used to provide sufficient lighter oil materials to decrease viscosity of the crude oil or bitumen for transport. The lighter molecules can be mixed with the heavier molecules of the crude oil, thereby reducing the overall viscosity of the crude oil.

Figure 1:
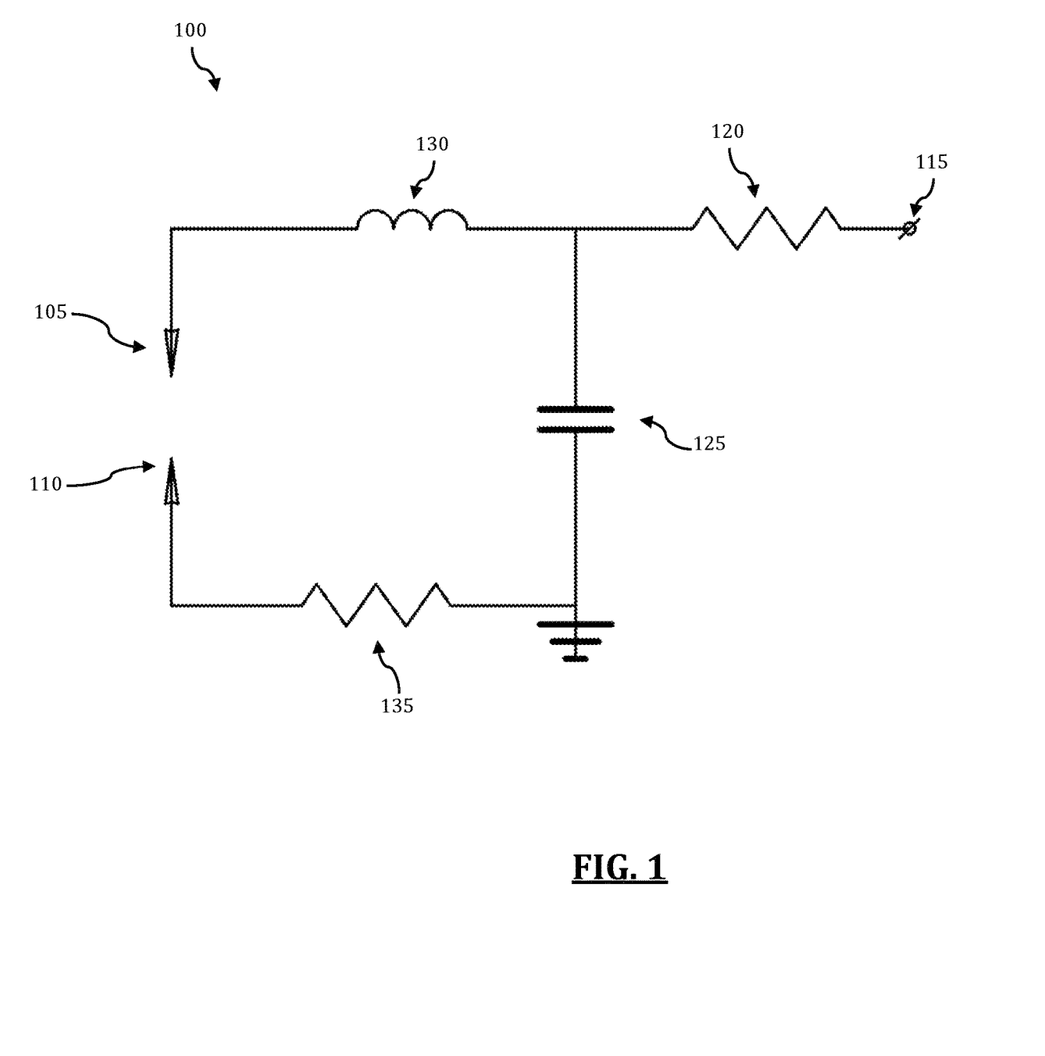
FIG. 1 is a circuit diagram of a spark generator in accordance with an illustrative embodiment.

The multispark devices and processes will be better understood by reference to the figures, which are non-limiting illustrations. FIG. 1 is a circuit diagram of a spark generator in accordance with an illustrative embodiment. An illustrative circuit 100 includes an anode 105, a cathode 110, a constructive resistor 135, a constructive inductor 130, a capacitor 125, a resistor 120, and a voltage 115. In alternative embodiments, additional or different elements may be used.

The voltage 115 is supplied by a constant voltage source. Energy is stored in the capacitor 125. When the voltage of the capacitor 125 reaches a breakdown voltage ($U_b$), the energy stored in the capacitor 125 is discharged across the gap between the anode 105 and the cathode 110, causing a spark. After the energy is discharged, energy from the voltage source begins building up in the capacitor 125 to repeat the cycle. In alternative embodiments, one or more switches can be used to control when the energy is discharged across the gap. This results in a pulsed discharge across the anode/cathode gap.

In an illustrative embodiment, the capacitor 125 is rated for a voltage that is 30%-40% greater than the nominal breakdown voltage of the gap. Using a capacitor 125 that is rated for more voltage than is used in the system can increase the life of the capacitor 125. For example, using ceramic capacitors in a pulsed system such as the circuit 100 at the rated voltage of the ceramic capacitors can result in a reduced lifetime of the ceramic capacitors, thereby causing additional maintenance and replacement costs.

The spark created between the anode 105 and the cathode 110 can cause material within the gap to heat up. In an illustrative embodiment, crude oil is pumped into a reactor channel that includes the anode 105 and the cathode 110. In some embodiments, the material within the gap includes high molecular weight hydrocarbon molecules and a carrier gas. In an illustrative embodiment, the high molecular weight hydrocarbon molecules have a high viscosity. For example, the material within the gap includes crude oil pumped from a source (e.g., a well) and a carrier gas that has a relatively low breakdown voltage. As discussed in greater detail below, the gap between the anode 105 and the cathode 110 can be within an enclosed channel. The crude oil can be pumped through the channel and through the gap.

The material in the gap between the anode 105 and the cathode 110 is heated to the point that a plasma forms within the gap. In the plasma, the high molecular weight, high viscosity hydrocarbons in the petroleum feedstock break down into lower molecular weight and, therefore, lower viscosity materials. This process is described in greater detail below.

As shown in FIG. 1, the anode 105 and the cathode 110 are separated by a gap. The gap may be filled with any suitable fluid or gas, such as, but not limited to, crude oil and a carrier gas. The circuit 100 includes a constructive resistor 135 and a constructive inductor 130. In an illustrative embodiment, the constructive resistor 135 and the constructive inductor 130 are inherent properties of the gap between the anode 105 and cathode 110 and are not separate components of the circuit 100. The constructive resistor 135 and the constructive inductor 130 are illustrated in FIG. 1 for ease of discussion.

The circuit 100 charges the capacitor 125. Once the capacitor 125 is charged to the breakdown voltage of the material between the anode 105 and the cathode 110, the energy stored in the capacitor 125 is discharged across the gap. Thus, the circuit 100 provides a pulsed power source to the gap. The time to charge the capacitor 125 can be determined using equations derived from theory or practice. For example, a characteristic time constant T of the charging capacitor 125 can be determined based on the resistance of the resistor 120 and the capacitance of the capacitor 125. Full charging of the capacitor 125 generally occurs during time $T=3R_0C_0$, where T is in seconds, $R_0$ is in Ohms, and $C_0$ is in Farads. In alternative embodiments, any suitable multiple of T can be used to determine when the capacitor 125 is "fully" charged. For example, the time to fully charge the capacitor 125 can be 4T, 5T, 6T, etc. The inventors have found that the capacitor 125 is fully charged during time 3T. In an illustrative embodiment, the faster the capacitor 125 charges, the faster that the discharge rate is and the more oil is processed for a given oil flow rate.

The constructive resistor 135 and the constructive inductor 130 of the circuit 100 can also be taken into consideration when the circuit is discharging across the anode 105 and the cathode 110. In illustrative embodiments, the capacitor 125 is located as close as possible to the gap between the anode 105 and the cathode 110, thereby reducing the size of the constructive inductor 130. Similarly, the leads to the anode 105 and the cathode 110 and the anode 105 and the cathode 110 can be made of highly conductive material, thereby reducing the value of the constructive resistor 135. That is, by using highly conductive material for the leads to the anode 105 and the cathode 110 and the anode 105 and the cathode 110, the value of the constructive resistor 135 can be determined primarily by the resistance across the gap between the anode 105 and the cathode 110. Thus, the energy dissipated by the constructive resistor 135 is used to heat the plasma between the anode 105 and the cathode 110 during the discharge.

Figure 2A:
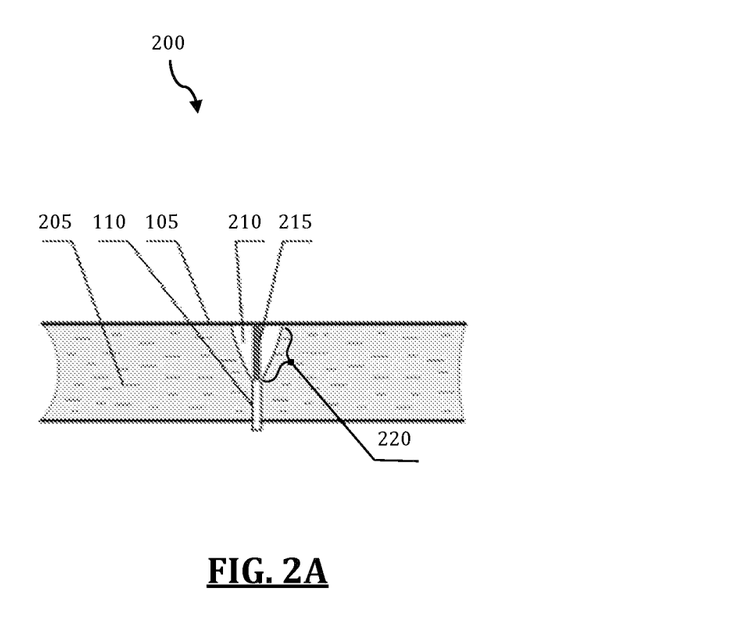
FIGS. 2A and 2B are cross-sectional illustrations of multispark reactor channels in accordance with illustrative embodiments.
Figure 2B:
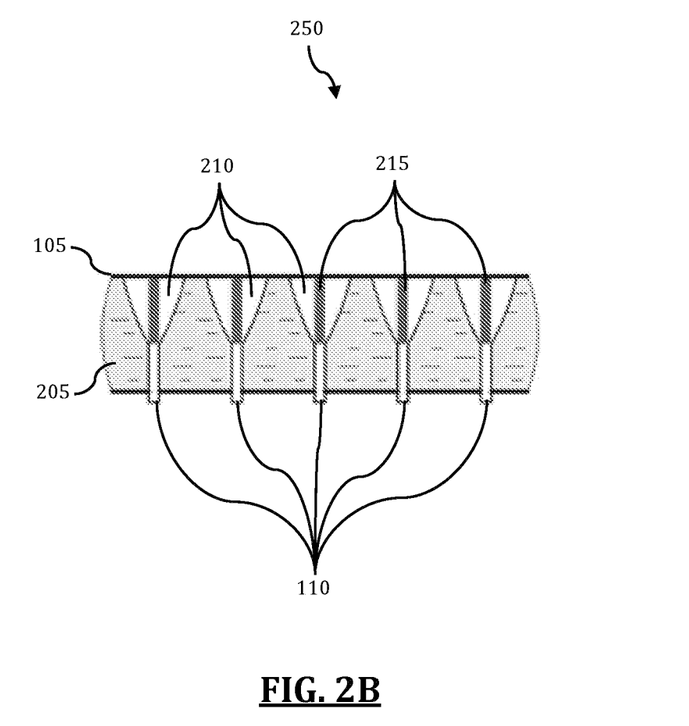

FIGS. 2A and 2B are cross-sectional illustrations of multispark reactor channels in accordance with illustrative embodiments. An illustrative multispark reactor 200 includes an anode 105, a cathode 110, a dielectric body 205, a channel 210, and a discharge pathway 215. An illustrative multispark reactor 250 includes an anode 105, a plurality of cathodes 110, a dielectric body 205, a plurality of channels 210, and a plurality of discharge pathways 215. In alternative embodiments, additional, fewer, and/or different elements can be used. FIGS. 2A and 2B are meant to be illustrative only, and not limiting with respect to the number of elements, the orientation of elements, etc.

As shown in FIG. 2A, the channel 210 can be formed within the dielectric body 205. The cathode 110 is exposed within the channel 210 and passes through the dielectric body 205. In an illustrative embodiment, the cathode 110 is connected to the electrical ground. The anode 105 is exposed to the channel 210. In an illustrative embodiment, the anode 105 and the cathode 110 are exposed on opposite sides of the channel 210. When electrical energy is discharged across the anode 105 and the cathode 110, the resulting spark can travel via the discharge pathway 215. In an illustrative embodiment, the discharge pathway 215 is shown in FIGS. 2A and 2B for illustrative purposes and the discharge pathway 215 does not correspond to a physical element of the multispark reactor 200 and/or the multispark reactor 250. In some embodiments, the discharge pathway 215 is formed by a carrier gas (as explained in greater detail below).

As shown in FIG. 2B, the multispark reactor 250 includes similar elements as the multispark reactor 200. The multispark reactor 250 includes multiple channels 210, each with a corresponding cathode 110 (and discharge pathway 215). In an illustrative embodiment, each of the channels 210 correspond to one of multiple anodes 105 that are each electrically connected to a respective capacitor.

Fluid material may pass through the channel 210 and be exposed to the electrical discharge across the anode 105 and the cathode 110. The amount of energy required to cause a spark between the anode 105 and the cathode 110 depends upon the breakdown voltage of the material that passes between the anode 105 and the cathode 110. In general, the breakdown voltage of gasses is significantly lower than the breakdown voltage of hydrocarbon liquids (e.g., crude oil). That is, the hydrocarbon liquids are better insulators than the gasses. For example, the breakdown voltage of dry air is approximately 30 kilovolts per centimeter (kV/cm), and the breakdown voltage of an oil used in electrical transformers is often between 280 kV/cm and 300 kV/cm and can be 350 kV/cm or greater.

If the channel 210 is filled with dry air and the distance between the anode 105 and the cathode 110 is 0.5 cm, the voltage required to cause a spark between the anode 105 and the cathode 110 can be about 15 kV. If the channel 210 is filled with a hydrocarbon liquid with a breakdown voltage of 300 kV/cm and the distance between the anode 105 and the cathode 110 is 0.5 cm, the voltage required to cause a spark between the anode 105 and the cathode 110 is about 150 kV.

The distance between the anode 105 and the cathode 110 also determines the amount of insulation required for other electrical components, such as leads. For example, wires that electrically connect to the anode 105 (and/or the cathode 110) must be sufficiently insulated such that the breakdown voltage across the wire and other components is greater than the breakdown voltage of the gap between the anode 105 and the cathode 110. Thus, in some embodiments, materials, such as gasses, are passed through the channel 210 with the crude oil to reduce the breakdown voltage across the anode 105 and the cathode 110, thereby reducing the amount of insulation required to maintain proper functionality of other electrical components.

Using gases with the crude oil in the channel 210 also increases the life of the anode 105 and the cathode 110. For example, when pure crude oil is passed through the channel 210 and the gap between the anode 105 and the cathode 110 is relatively large, then a relatively large amount of crude oil can flow through the channel 210, but insulation for other electrical components will be relatively high, as discussed above. However, if the gap between the anode 105 and the cathode 110 is reduced, there is less flow of the crude oil through the gap. Additionally, continuous discharging of energy across the anode 105 and the cathode 110 can erode the materials from which the anode 105 and the cathode 110 are constructed. With a smaller gap, the erosion of the anode 105 and the cathode 110 is more pronounced. For example, if the gap is 1 millimeter (mm) and the gap is increased by 0.1 mm or 0.2 mm, i.e. the gap is increased by 10%-20%, thereby changing the required breakdown voltage by 10%-20%. However, if the gap is 0.5 cm (e.g., by flowing gasses with the crude oil) and the gap is increased by 0.1 mm or 0.2 mm, the gap is increased by a mere 2%-4%.

Using gasses with the crude oil in the channel 210 also increases the effectiveness of the reactor. For example, active radicals are formed in the late stage of the power input into the plasma spark discharge when using a carrier gas with the crude oil. In some embodiments, the carrier gas is provided in the process to serve as a hydrogen atom source. Suitable carrier gases may include, but are not limited to, hydrogen-atom-containing gases. Illustrative carrier gases may include, but are not limited to, water, steam, hydrogen, nitrogen, argon, methane, natural gas, and other gaseous hydrocarbons. In an illustrative embodiment, the carrier gas includes associated gas that is 90-98% methane and/or other hydrocarbons. In some embodiments, a mixture of such illustrative carrier gases may be used. If pure crude oil is passed through the channel 210 and through the plasma generated by the spark, fewer active radicals are formed in the late stage of the spark. Further, during the initial stages of the spark formation, such as during a non-equilibrium mode of discharge, electrons forming the plasma have a relatively high energy. In an illustrative embodiment, the non-equilibrium mode of discharge includes the phase of the discharge in which the temperature of the plasma components is not in equilibrium. For example, the temperature of the electrons in the external electric field is higher than the temperature of heavier particles such as molecules, atoms, ions, and free radicals. The external electric field is the electric field created between the electrodes of the discharge gap (e.g., as opposed to electric fields created within the plasma created by the discharge). The electrons forming the plasma during the non-equilibrium mode of discharge acquire the relatively high energy from the external field. Thus, during early stages and late stages of the discharge, the carrier gas dissociates and forms free radicals which are used in the production of the light hydrocarbon fractions. Put another way, before and after the breakdown of the crude oil, the carrier gas dissociates and forms free radicals. Thus, in some embodiments, by using a carrier gas with the crude oil, the operating voltage of the power source is reduced, the deleterious effects of electrode erosion are reduced, and the probability of generating light fractions of liquid hydrocarbons is increased. By reducing the operating voltage of the power source, the size of the dimensions and insulation of the other components can be reduced.

In some embodiments, the spark discharge affects the material within the channel 210 via non-thermal methods. For example, a discharge can produce ultraviolet light and/or shock waves. In an illustrative embodiment, the ultraviolet light is absorbed by nearby hydrocarbon molecules and contributes to the degradation of the hydrocarbon molecules. In an illustrative embodiment, when the carrier gas (or other material) is transformed into plasma via the electric discharge, a shock wave in the fluid is formed. The shock wave passes through and is absorbed by the hydrocarbon molecules. The shock wave can facilitate mechanical destruction of, for example, agglomerates of materials such as, but not limited to, asphaltene and aromatic molecules. Such mechanical destruction can decrease the viscosity of the fluid.

In an illustrative embodiment, the length 220 of the wall of the dielectric material of the channel 210 is long enough to ensure that the spark travels through the middle of the channel 210 and not along the wall of the channel 210 (e.g., via the dielectric body 205). For example, if the channel 210 is filled with air that has a breakdown voltage of 30 kV/cm and the dielectric body 205 has a breakdown voltage of 20 kV/cm, the distance between the anode 105 and the cathode 110 should be less than $2/3$ of the length 220. To achieve such a ratio, any suitable method can be used. For example, the anode 105 and/or the cathode 110 can be inserted into the channel 210 to reduce the distance between the anode 105 and the cathode 110. In another example, the length 220 can be modified, such as by using a round, elliptical, oval, rectangular, or any other suitable cross-sectional shape for the channel 210.

Figure 3:
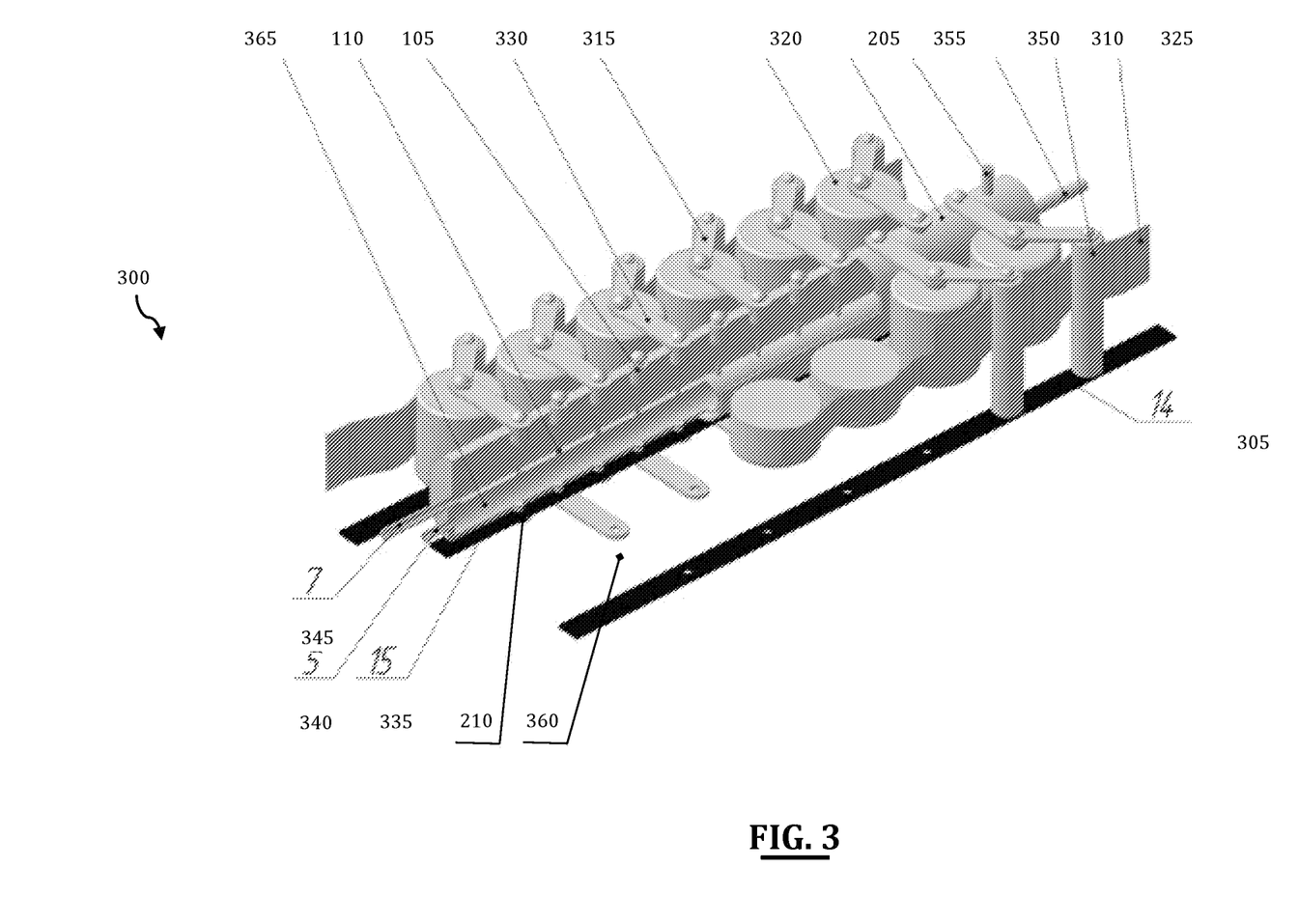
FIG. 3 is an isometric view with a cutaway of a multispark reactor in accordance with an illustrative embodiment.

FIG. 3 is an isometric view with a cutaway of a multispark reactor in accordance with an illustrative embodiment. An illustrative multispark reactor 300 includes a plurality of anodes 105, a plurality of cathodes 110, a channel 210, a power rail 305, a plurality of resistors 310, a plurality of electrical connector strips 315, a plurality of capacitors 320, a dielectric barrier 325, a plurality of electrical connector strips 330, a grounding rail 335, a carrier gas inlet port 340, an oil inlet port 345, a treated oil outlet port 350, and exhaust port 355, a plurality of grounding strips 360, and a carrier gas manifold 365. In alternative embodiments, additional, fewer, and/or different elements may be used.

As illustrated in FIG. 3, an illustrative multispark reactor 300 can include multiple spark generators (e.g., multiple circuits 100). Although the embodiment in FIG. 3 includes twelve spark generators, any suitable number may be used. The power rail 305 can provide power to the spark generators (e.g., can be the voltage 115). The resistors 310 are connected to the power rail 305 and to a respective one of the capacitors 320 via one of the electrical connector strips 315. The positive electrical terminal of each of the capacitors 320 is connected to one of the anodes 105 via one of the electrical connector strips 330. The dielectric barrier 325 is placed between the resistors 310 and the capacitors 320 to as an insulative barrier. The dielectric barrier 325 can be used to prevent arcing between the power rail 305 and the grounding strips 360. In alternative embodiments, any suitable method of preventing arcing between the various electrical components may be used. The negative terminal of the capacitors 320 are grounded to the grounding rail 335 via the grounding strips 360.

As shown in FIG. 3, there is a gap between each of the anodes 105 and the cathodes 110. The dielectric body 205 includes an internal carrier gas manifold 365. The cathodes 110 are connected to the carrier gas manifold 365, which is connected to the grounding rail 335. Thus, the cathodes 110 are grounded through the carrier gas manifold 365. Each of the cathodes 110 are hollow and allow the carrier gas to flow through the cathodes 110. In an illustrative embodiment, each of the cathodes 110 has a lumen that extends through the cathode 110 and allows the carrier gas to flow from the carrier gas manifold 365 into the gap between the anodes 105 and the cathodes 110. In an alternative embodiment, the carrier gas flows through the anodes 105.

In an illustrative embodiment, crude oil flows into the multispark reactor 300 via the oil inlet port 345 and the carrier gas flows into the multispark reactor 300 via the carrier gas inlet port 340. Thus, the oil inlet port 345 is configured to introduce the crude oil into the channel via a process stream. The carrier gas flows through the carrier gas manifold 365, through the cathodes 110 and into the channel 210. In an illustrative embodiment, the flow of the carrier gas though the cathodes 110 and into the channel 210 creates a relatively low breakdown voltage (e.g., compared to the crude oil) and creates a pathway for the spark between the anode 105 and the cathode 110. As the crude oil flows through the channel 210 (e.g., from the oil inlet port 345 to the treated oil outlet port 350), carrier gas is injected into the crude oil stream and facilitates the plasma formation within the crude oil stream. The plasma breaks down the hydrocarbon molecules to form light hydrocarbon fractions.

In an illustrative embodiment, the carrier gas flows through the carrier gas inlet port 340, through the carrier gas manifold 365, through the cathodes 110, and through the exhaust port 355. The crude oil flows through the oil inlet port 345, through the channel 210, and through the treated oil outlet port 350. In such an embodiment, the crude oil that passes through the treated oil outlet port 350 does not include a significant amount of carrier gas. In such an embodiment the carrier gas exits the multispark reactor 300 via the exhaust port 355. In an illustrative embodiment, excess gasses can be exhausted through the exhaust port 355. In some embodiments, the exhaust port 355 includes a pressure relief valve to control the pressure within the channel 210. In an illustrative embodiment, the processed crude oil flows from the channel 210 and through the treated oil outlet port 350 to a collection point. From the collection point, the processed crude oil can be transported to any suitable location, such as to a refinery.

In the embodiment illustrated in FIG. 3, the capacitors 320 are arranged on either side of the channel 210 in an alternating fashion. Such an arrangement allows the distance between the anodes 105 (and the cathodes 110) to be reduced. In such an arrangement, the minimum distance between the anodes 105 (and the cathodes 110) is half of the diameter of the capacitors 320. In such embodiments, the capacitors are arranged on the same plane. In alternative embodiments, any suitable arrangement of capacitors may be used. For example, the capacitors 320 can be arranged such that some of the capacitors 320 are located closer or further away from the dielectric body 205. In another example, some of the capacitors 320 may be arranged on a different plane (e.g., on top of the dielectric body 205). Minimizing the distance between the anodes 105 (and the cathodes 110) increases the number of sparks per length of the channel 210 (e.g., increases the spark density) thereby increasing the percentage of crude oil processed for a given length of the channel 210.

Figure 4:
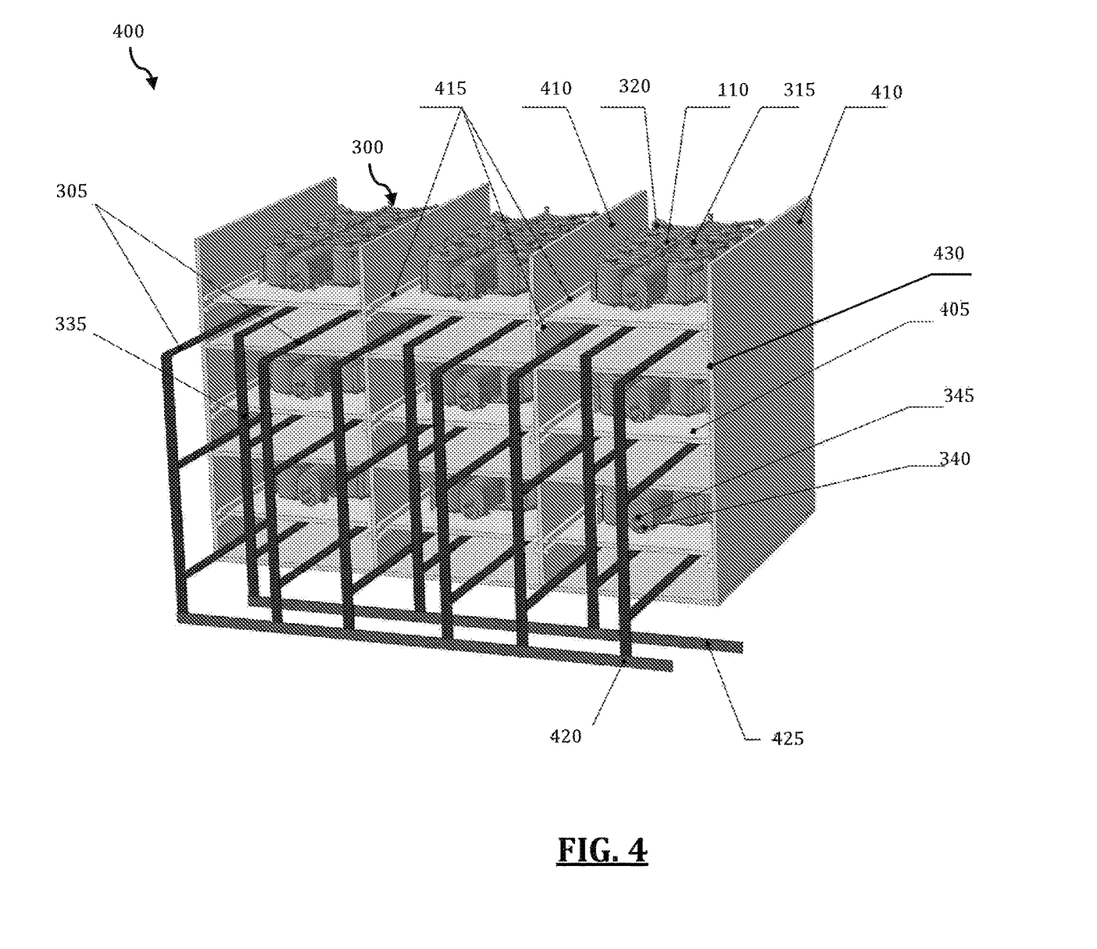
FIG. 4 is an isometric view of a multispark reactor in accordance with an illustrative embodiment.
Figure 5A:
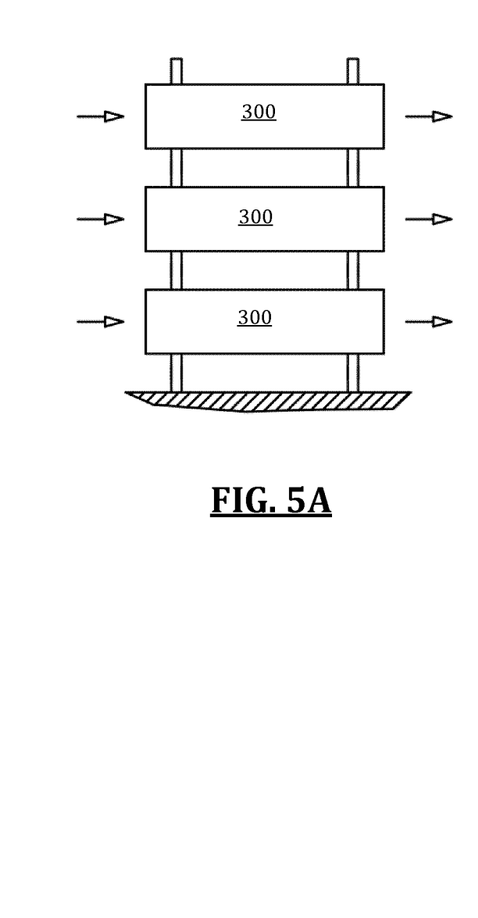
FIGS. 5A-5C show multiple multispark reactors plumbed in various configurations in accordance with illustrative embodiments.
Figure 5B:
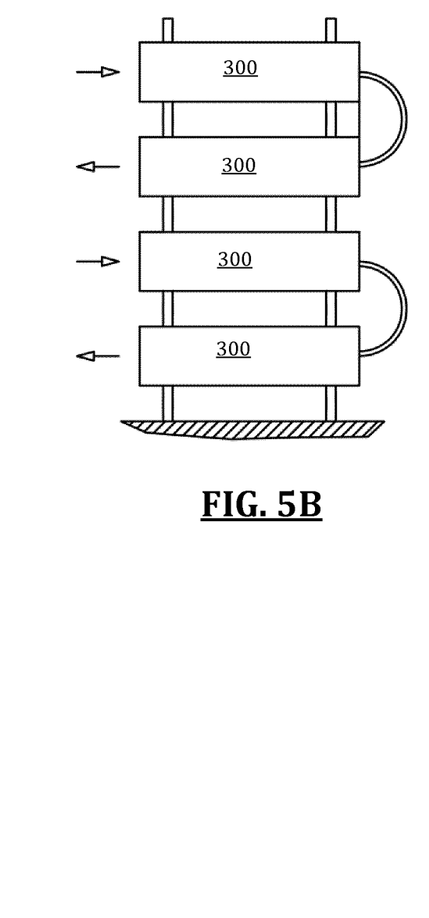
Figure 5C:
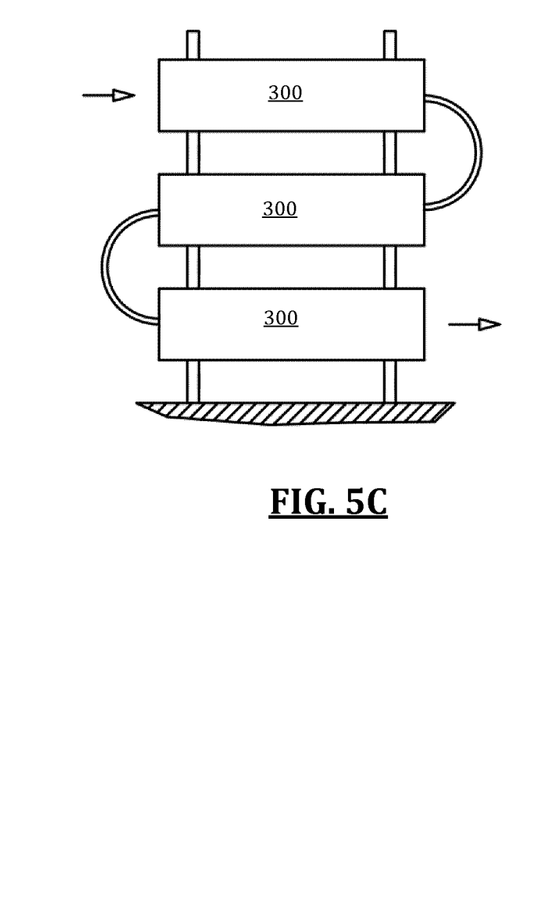

FIG. 4 is an isometric view of a multispark reactor in accordance with an illustrative embodiment. An illustrative multispark reactor 400 is shown including nine multispark reactors 300. The process flow of the multispark reactors 300 can be connected in any suitable manner or combination (e.g., in parallel and/or series). For example, FIGS. 5A-5C show multiple multispark reactors plumbed in various configurations in accordance with illustrative embodiments. The arrows in the FIGS. 5A-5C illustrate the process flow of the crude oil through the multispark reactors 300. In FIG. 5A, three multispark reactors 300 are configured to be run in parallel with one another. In FIG. 5B, two sets of two multispark reactors 300 are configured to be run in parallel with one another, and each of the multispark reactors 300 in each set are run in series with one another. In FIG. 5C, three multispark reactors 300 are configured to run in series with one another. Any suitable number, or configuration, of multispark reactors 300 can be used. For example, one or more multispark reactors 300 can be run in series to increase the percentage of light hydrocarbon fractions created in the flow of crude oil. Multiple multispark reactors 300 (or sets of multispark reactors 300 run in series) can be run in parallel to increase the total flow of processed crude oil.

Referring to FIG. 4, an illustrative system 400 includes a plurality of multispark reactors 300 (each with a plurality of cathodes 110, electrical connector strips 315, and capacitors 320). Some of the multispark reactors 300 are stacked (e.g., three high in the embodiment illustrated in FIG. 4). The stacks of multispark reactors 300 are separated by walls 410. Each of the multispark reactors 300 in each stack sit on one of the shelves 405. Beneath the shelves 405 are the power rail 305 and grounding rail 335 that provide electrical power and ground to the multispark reactors 300 that sit on the shelves 405. Between the multispark reactors 300 and the power rails 305/grounding rails 335 are barriers 430. The barriers 430 provide electrical insulation between the electrical components of the multispark reactor 300 (e.g., the cathode 110, the electrical connector strips 315, and the capacitors 320) and the power rails 305/grounding rails 335. The power rails 305 and the grounding rails 335 are electrically connected to a main positive bus 420 and a main ground bus 425, respectively.

Figure 7:
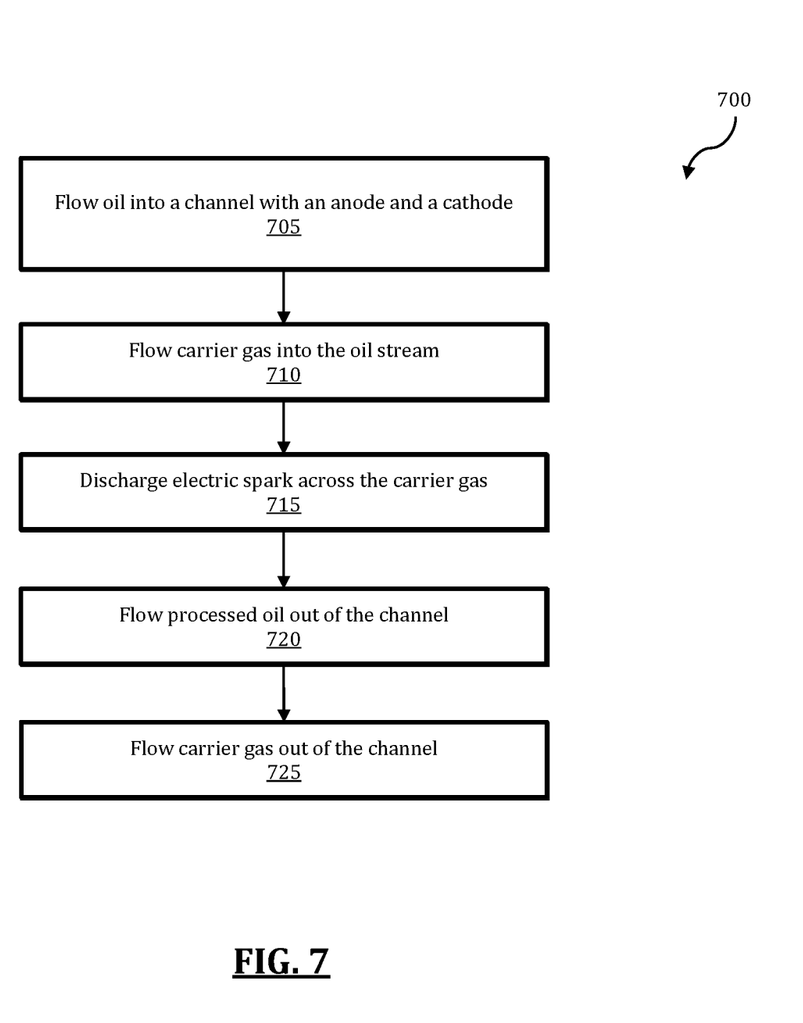
FIG. 7 is a flow diagram of a method for processing oil in accordance with an illustrative embodiment.

FIG. 7 is a flow diagram of a method for processing oil in accordance with an illustrative embodiment. In alternative embodiments, additional, fewer, and/or different operations may be used. Also, the use of a flow diagram and/or arrows is not meant to be limiting with respect to the order or flow of operations. For example, two or more of the operations may be performed simultaneously.

In an operation 705, oil is flowed into a channel with an anode and a cathode. In an illustrative embodiment, the channel has a plurality of pairs of anodes and cathodes. The channel can be, for example, the channel 210. The oil can be, for example, crude oil.

In an operation 710, carrier gas is flowed into the oil stream. Any suitable carrier gas can be used. In an illustrative embodiment, the carrier gas is injected into the oil stream such that the carrier gas bridges the gap between the anode and the cathode. In some embodiments, the carrier gas is flowed into the oil stream via a hollow anode and/or a hollow cathode.

In an operation 715, an electric spark is discharged across the carrier gas. For example, electricity can arc between the anode and the cathode. In an illustrative embodiment, a capacitor is used for each anode and cathode pair. Such a capacitor can be used to store energy until enough energy is stored to arc across the anode and the cathode. The electric discharge can heat the carrier gas and the oil surrounding the carrier gas and cause the oil to break down into smaller molecules.

In an operation 720, processed oil is flowed out of the channel. In an illustrative embodiment, some of the oil that flowed through the channel was broken down by one or more electric discharges. The molecules that were broken down are mixed with the oil molecules that did not break down. The mixture flows through the channel, through the sparks, and out of an exit port. In an operation 725, carrier gas is flowed out of the channel. In some embodiments, the exit port through which the processed oil exits can also be used to flow the carrier gas out of the channel. In an illustrative embodiment, a second exit port is used through which the carrier gas exits the channel. In such an embodiment, the second exit port can be located at the top of the channel. Thus, the carrier gas, which is less dense than the oil, floats to the top of the channel and exits the channel through the second exit port.

EXAMPLES

Example 1

Nine multispark reactors 300 were used in parallel (e.g., as shown in FIG. 4). Each multispark reactor 300 had twenty spark gaps. The anodes 105 were formed from steel rods with a diameter of 5 millimeters (mm). The cathodes 110 were formed from steel tubes with an inner diameter of 0.7 mm and an outer diameter of 1 mm. As in the configuration illustrated in FIG. 3, ten capacitors 320 were located on each side of the channel 210 of each multispark reactor 300. Each capacitor 320 had a capacitance of 200 picoFarads (pF) with a rated voltage of 30 kV. The diameter of each capacitor 320 was 20 mm and the distance between the anodes 105 (and the cathodes 110) along the channel 210 was 12 mm. The channel 210 was 30 mm long. The distance between the anodes 105 and the corresponding cathodes 110 (e.g., the discharge gap) was 5 mm. The carrier gas was methane, which has a breakdown voltage of 32 kV/cm. The source voltage 115 was 20 kV. The resistors 310 each had a resistance of 500 mega Ohms.

The system was used to process heavy crude oil. Heavy crude oil was introduced to each of the multispark reactors 300 with an American Petroleum Institute (API) gravity of 8.5 degrees. The oil was pumped through each of the multispark reactors 300 at a rate of 4 cubic centimeters per minute ($cm^3$/min), and the carrier gas (methane) was pumped into each multispark reactor 300 at a rate of 300 $cm^3$/min. The pulse repetition discharge rate was approximately 3 Hertz (Hz). After about thirty minutes of running the system, the output crude oil had an API gravity of 14 degrees.

The API gravity measurement is a measurement of the density of a petroleum liquid compared to water. An API gravity of less than 10 degrees indicates that the material is denser than water. An API gravity of greater than 10 degrees indicates that the material is less dense than water. Although the API gravity measurement unit is referred to as "degrees," mathematically the API gravity measurement is unitless. Accordingly, in the example above, the heavy crude oil that was introduced into the multispark reactors 300 was denser than water, but the processed output crude oil was less dense than water.

Figure 6:
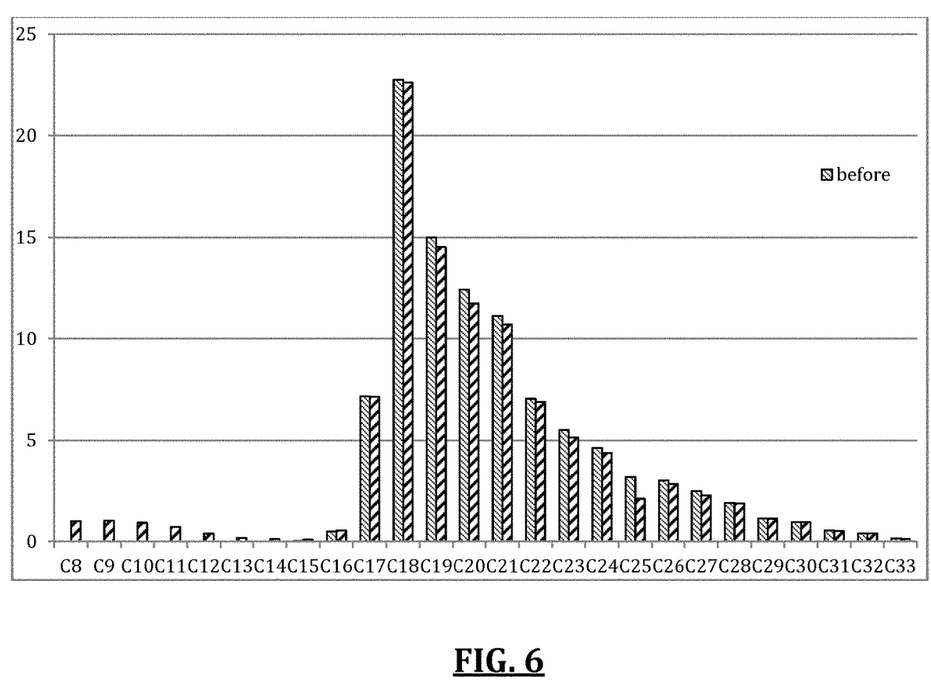
FIG. 6 is a histogram of hydrocarbon fractions before and after treatment of oil in accordance with an illustrative embodiment.

FIG. 6 is a histogram of hydrocarbon fractions before and after treatment of oil, in accordance with an illustrative embodiment. A liquid chromatograph was used to determine the number of carbon atoms per molecule. The Y-axis is the percentage of each hydrocarbon molecule in the oil stream by weight. The X-axis is the number of carbon molecules in each hydrocarbon molecule. As shown in FIG. 6, almost all of the hydrocarbon molecules of the heavy crude oil input into the multispark reactors 300 had at least seventeen carbon atoms per molecule and none of the hydrocarbon molecules had fewer than fifteen carbon atoms per molecule. However, the oil exiting the multispark reactors 300 had fewer hydrocarbon molecules with seventeen or more carbon atoms per molecule, and approximately four percent of the oil stream consisted of hydrocarbons with fewer than fifteen carbon atoms per molecule. Accordingly, the oil stream leaving the multispark reactors 300 had a lower viscosity than the oil stream entering the multispark reactors 300.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The subject matter described herein sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
    a channel having an inlet and an outlet;
    a first electrode disposed within the channel;
    a second electrode disposed within the channel so as to define a gap between the second electrode and the first electrode; and
    a power source connected to at least one of the electrodes; wherein:
        the second electrode comprises a lumen extending from a first end of the second electrode to a second end of the second electrode, the lumen configured to introduce a carrier gas to the gap;
        the inlet is configured to introduce a process stream to the channel, the process stream comprising a viscous petroleum feed material;

the power source is configured to produce a spark within the gap, thereby generating a plasma configured to reduce a viscosity of the viscous petroleum feed material and to form a processed petroleum material; and the outlet is configured to convey the processed petroleum material from the channel to a collection point;

wherein the device further comprises:

a plurality of first electrodes and a plurality of second electrodes, wherein each of the plurality of first electrodes corresponds to one of the plurality of second electrodes, and wherein each of the plurality of the first electrodes and corresponding one of the plurality of second electrodes is configured to cause a spark within the channel; and a plurality of capacitors, wherein each of the plurality of capacitors corresponds to one of the plurality of first electrodes, and wherein the plurality of capacitors is aligned on alternating sides of the channel.

2. The device of claim 1, wherein the viscous petroleum feed material comprises crude oil, wherein molecules of the viscous petroleum feed material comprise hydrocarbon molecules, and wherein to reduce the viscosity of the viscous petroleum feed material, the plasma is configured to reduce an average number of carbon atoms per hydrocarbon molecule of the viscous petroleum feed material.

3. The device of claim 1, wherein the first electrode is an anode and the second electrode is a cathode.

4. The device of claim 1, further comprising a carrier gas feed tube that is fluidly connected to the lumen of each of the plurality of second electrodes.

5. The device of claim 1, wherein the power source comprises:

a capacitor electrically connected in parallel with the first electrode and the second electrode; and a constant voltage power source that is configured to provide a voltage that is greater than or equal to a breakdown voltage of the carrier gas across the gap.

6. The device of claim 1, wherein viscous petroleum feed material has an API gravity that is less than ten degrees, and wherein the processed petroleum material has an API gravity that is greater than ten degrees.

7. The device of claim 1, wherein the carrier gas comprises a gaseous hydrocarbon.

8. The device of claim 1, wherein the carrier gas comprises at least one of water, steam, hydrogen, methane, or natural gas.

9. The device of claim 1, wherein to produce the spark, the power source provides a pulsed current through the gap.

10. The device of claim 1, wherein the power source is configured to produce the spark by discharging the plurality of capacitors.

11. The device of claim 1, wherein the power source is configured to produce the spark by discharging a capacitor that is electrically connected in parallel with the first electrode and the second electrode.

12. A device comprising:

a channel having an inlet configured to introduce a process stream to the channel, and an outlet configured to convey processed petroleum material from the channel;

a plurality of electrodes, each electrode at least partially disposed within the channel, wherein a first electrode of the plurality of electrodes is separated from a second electrode of the plurality of electrodes so as to define a gap between the first electrode and the second electrode, and wherein the second electrode comprises a lumen extending from a first end of the second electrode to a second end of the second electrode, the lumen configured to introduce a carrier gas to the gap; and a first capacitor and a second capacitor positioned at opposing sides of the channel;

wherein the first electrode and the second electrode are configured to connect to a power source, and wherein the device is configured to cause a spark in the gap to generate a plasma configured to reduce a viscosity of a viscous petroleum feed material in the process stream and thereby form the processed petroleum material.

13. The device of claim 12, wherein the first electrode is an anode and the second electrode is a cathode.

14. The device of claim 12, further comprising a carrier gas feed tube that is fluidly connected to the lumen of the second electrode.

15. The device of claim 12, further comprising a power source having a constant voltage source configured to supply a voltage greater than or equal to a breakdown voltage of the carrier gas.

16. The device of claim 12, wherein the device is configured to produce the spark by providing a pulsed current through the gap.

17. The device of claim 12, wherein the device is configured to produce the spark by discharging one or more capacitors.

* * * * *